US010774014B2

(12) United States Patent
Elizundia Eriz et al.

(10) Patent No.: US 10,774,014 B2
(45) Date of Patent: Sep. 15, 2020

(54) AMMONIUM NITRATE PRODUCTS AND METHOD FOR PREPARING THE SAME

(71) Applicant: MaxamCorp Holding, S.L., Madrid (ES)

(72) Inventors: Unai Elizundia Eriz, Galdakao (ES); Mateusz Marek Hass, Mazingarbe (FR)

(73) Assignee: MAXAMCORP HOLDING, S.L., Madrid (ES)

( * ) Notice: Subject to any disclaimer, the term of this patent is extended or adjusted under 35 U.S.C. 154(b) by 140 days.

(21) Appl. No.: 15/550,320

(22) PCT Filed: Feb. 9, 2016

(86) PCT No.: PCT/EP2016/052738
§ 371 (c)(1),
(2) Date: Aug. 10, 2017

(87) PCT Pub. No.: WO2016/128406
PCT Pub. Date: Aug. 18, 2016

(65) Prior Publication Data
US 2018/0016201 A1 Jan. 18, 2018

(30) Foreign Application Priority Data

Feb. 10, 2015 (EP) .................................. 15382047

(51) Int. Cl.
*C06B 31/28* (2006.01)
*C01C 1/18* (2006.01)
(Continued)

(52) U.S. Cl.
CPC ............... *C06B 31/28* (2013.01); *C01C 1/18* (2013.01); *C01F 7/02* (2013.01); *C01P 2004/60* (2013.01); *C01P 2006/12* (2013.01)

(58) Field of Classification Search
USPC .................... 149/45, 46, 108.8, 109.4, 109.6
See application file for complete search history.

(56) References Cited

U.S. PATENT DOCUMENTS

| 3,190,774 A | 6/1965 | Wilson | |
| 3,493,445 A * | 2/1970 | Kinzo | C06B 23/009 |
| | | | 149/46 |

(Continued)

FOREIGN PATENT DOCUMENTS

| CN | 102432406 | 5/2012 |
| CN | 103641668 | 3/2014 |

(Continued)

OTHER PUBLICATIONS https://web.archive.org/web/20140709093650/https://www.vanairsystenns.com/products_desiccants/activated-alumina.html 2014.*

(Continued)

*Primary Examiner* — James E McDonough
(74) *Attorney, Agent, or Firm* — Tristan A. Fuierer; Olive Law Group, PLLC

(57) ABSTRACT

The invention refers to a free-flowing ammonium nitrate (AN) product which comprises a mixture of AN particles and beads or granules of activated alumina, a process for preparing the same and the use of said beads or granules as free-flowing additive for AN particles.

15 Claims, 1 Drawing Sheet

(51) Int. Cl.
    *C01F 7/02*     (2006.01)
    *C06B 31/00*     (2006.01)
    *D03D 23/00*     (2006.01)
    *D03D 43/00*     (2006.01)

(56) References Cited

U.S. PATENT DOCUMENTS

| | | | |
|---|---|---|---|
| 4,001,378 A | | 1/1977 | Jasnosz |
| 4,397,719 A | * | 8/1983 | Yoshida .......... C01B 21/50 204/238 |
| 4,486,396 A | | 12/1984 | Kjohl et al. |
| 4,678,524 A | * | 7/1987 | Cranney .......... C06B 45/00 149/21 |
| 4,717,555 A | | 1/1988 | Newman et al. |
| 5,472,530 A | | 12/1995 | Obrestad et al. |
| 7,806,999 B2 | * | 10/2010 | Verity .......... C06B 31/285 149/108.2 |
| 2003/0051786 A1 | | 3/2003 | Verity |

FOREIGN PATENT DOCUMENTS

| | | |
|---|---|---|
| DE | 4340577 | 5/1995 |
| EP | 0692468 | 1/1996 |
| EP | 0769483 A1 | 4/1997 |
| EP | 1123257 | 8/2001 |
| ES | 2291360 T3 | 3/2008 |
| WO | WO-200007938 | 2/2000 |
| WO | WO-2016128406 | 8/2016 |

OTHER PUBLICATIONS

"International Application No. PCT/EP2016/052738, International Search Report and Written Opinion dated Apr. 21, 2016", (dated Apr. 21, 2016), 9 pgs.

Cohen, Alan P., "Desiccants", Kirk-Othmer Encyclopedia of Chemical Technology, vol. 8, Copyright John Wiley & Sons, Inc. (2003), (Mar. 14, 2003), 355-382.

* cited by examiner

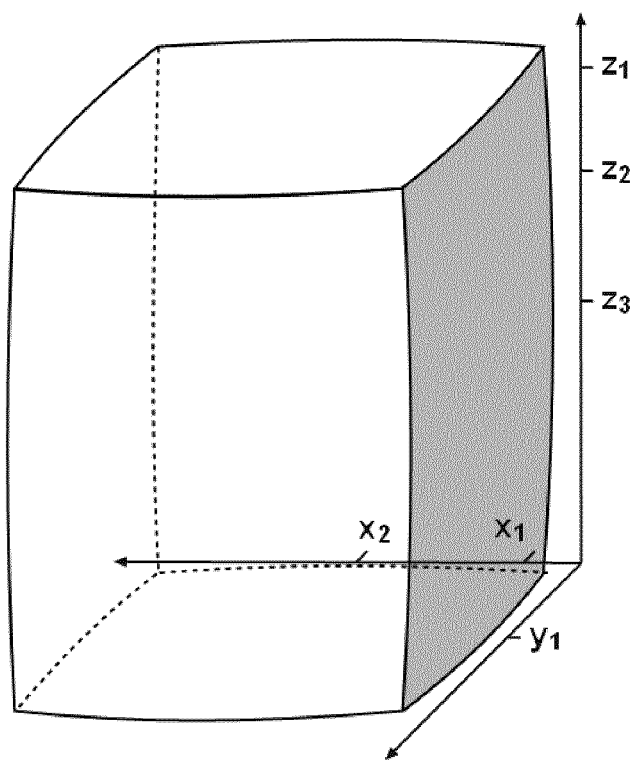

AMMONIUM NITRATE PRODUCTS AND METHOD FOR PREPARING THE SAME

PRIORITY CLAIM TO RELATED APPLICATIONS

This application is a U.S. national stage application filed under 35 U.S.C. § 371 from International Application Serial No. PCT/EP2016/052738, which was filed 9 Feb. 2016, and published as WO2016/128406 on 18 Aug. 2016, and which claims priority to European Application No. 15382047.7, filed 10 Feb. 2015, which applications and publication are incorporated by reference as if reproduced herein and made a part hereof in their entirety, and the benefit of priority of each of which is claimed herein.

FIELD OF THE INVENTION

The present invention relates to Ammonium Nitrate (AN) products having improved flowing behaviour and a method for preparing the same. Such products are useful as raw materials in the explosives industry.

BACKGROUND OF THE INVENTION

AN is manufactured in many particulate forms: prills, flakes, powder and granules, as well as saturated aqueous solutions. AN particulate matter is a readily available low-cost source of oxygen and is stable enough at room temperature scale to be safely transported, stored and blended with other explosive components. Given these attributes, it is extensively used in the explosives industry as the main component (in terms of formulation content) for almost all commercial explosives: Ammonium Nitrate-Fuel Oil (ANFO), emulsions and watergels, used in the world today.

Despite the large-scale utilization of AN particulate matter, the salt exhibit a number of undesirable properties. The hygroscopicity, the strong dependence of its solubility with temperature and the specific volume variations ascribed to crystalline transitions, frequently cause problems in production, handling and storage operations.

It is well known that AN particles have a noticeable tendency to cake with storage time. In the absence of transitions on the crystal structure, this phenomenon is related to the adsorption of water and subsequent AN dissolution to form saturated AN solution, which if located at interparticle contact points may lead to crystal bridge formations as it crystallizes with a decrease in temperature. A second mechanism involves the merging of capillary forces due to the presence of solution at the contact points. This is, there is an inter-particle bonding tendency which extrapolated to bulk AN material might lead to cake formation, whose extension, in terms of hardness and quantity of the bulk AN involved in the caking process depends on storage time, storage conditions (pressure, Relative Humidity (RH) and temperature) and product characteristics.

Additionally, this bonding tendency, also known as cohesiveness of the AN material, has an impact on its flowing behaviour. This flowability of bulk AN particles is a critical characteristic, especially if product is used for explosive production. Most of the mechanical blending operations involved in explosive manufacturing require bulk AN particles flowing free, i.e. mass-flow behaviour, thus deviations/restrictions to flow can cause alterations in final explosive formulation. As an example of this problem, when AN particles discharge from hoppers to feed blenders (i.e. mixing with fuel-oil for ANFO production or mixing with emulsion or watergel explosive matrices for "blended explosives"), arching and ratholing are recurrent events at the hopper that results in irregular or even total suppression of AN flow, leading to important operational problems as erroneous explosive compositions.

A comprehensive work has been performed till date with the aim of minimizing particulate AN products cohesiveness, most of it focussed on coating AN particles with different anticaking agents. U.S. Pat. No. 4,001,378 describes anticaking compositions consisting on alkene sulphonates combined with kieselguhr or inorganic powders such as magnesium carbonate or clay. Sprayable aqueous naphthalene sulphonates, which could be mixed with alkene sulphonates, were proposed in U.S. Pat. No. 4,717,555 as anticaking coating. Patent Application EP-A-692468 proposes the use of sprayable compositions containing oily products and waxes together with compounds obtained by reacting an amine or an alcohol with an acid or a carboxylic anhydride containing a C20-C500 hydrocarbonated group, compounds that are known and available in the market.

The state of the art lies on using organic nature active anti-caking agent coatings which act as barrier for minimizing contact area involving direct AN interaction in between adjacent particles, where interparticle bonds can be generated due to capillarity or to crystal bridges after recrystallization.

However, apart from active anti-caking formulation, the coating agent distribution among the AN particles surface will have an impact on its performance. Coating is normally applied by spraying the melted anti-caking over AN particles and its dose is limited by regulation to <0.2 wt % as carbon. The coating system configuration, noozles and drum, is designed to maximize the dispersion of the coating agent. However, the surface structure of the AN particles, if rough enough, could physically impede its dispersion throughout. This is especially evident for porous AN particles produced from prilling AN solutions containing water (1-10 wt %). The moisture present in the prilled AN as AN solution is removed in drying steps, where the smooth surface achieved during crystallization due to the exposure to cooling air at the prilling tower is lost, due to the merging towards the surface of part of the inner AN solution through the pore network and its subsequent crystallization at the surface resulting in the formation of surface bulges.

Most commercially available coating technologies claim to provide anticaking properties and even moisture barrier properties, connected to its hydrophobicity. However, as it is known by the person skilled in the art, all the commonly used organic coatings do not show specific activity as moisture traps and tend to be poor water vapour barriers. This together with relatively poor coating dispersion (i.e. normally far from total coverage of AN particles surface) results in direct AN contact areas in between particles susceptible to get moisturized and thus to form inter-particle bonds.

U.S. Pat. No. 5,472,530 claims the application of aqueous solutions of magnesium or calcium nitrate in process stage prior to final drying step as anticaking agent. Then the particles are dried to a water content equal or below the maximum amount of crystal water that can be bound by said inorganic salts. In contrast to other coating additives, these partially hydrated salts work as moisture traps. However, it was found that for porous AN products this solution is not well suited due to the fact that it would induce structural changes such as pore blocking, affecting its final characteristics as raw material for explosive manufacture.

In a similar basis, but with the objective of stabilizing AN particles against thermal cycling, U.S. Pat. No. 4,486,396 claims the coating with porous powders, preferably silicon dioxide and a dust-biding agent and/or an anticaking agent, showing this coating the ability to bind water. However, operational difficulties such as generation of dusty environments and the need to fix powder material to AN particle surface limits this technique. Even mechanical mixing with drying agents, such as silicagel and AN particles containing Magnesium Nitrate (MgN) has been claimed, EP 1 123 257, as an effective stabilizing additive against thermal cycling if its dose drying capacity accounts for the free water present at the AN.

In spite of this background, there is a continuing need and demand for ammonium nitrate products showing improved flowing behavior that complement or improve those already known in the state of the art.

BRIEF DESCRIPTION OF THE INVENTION

The main object of the present invention was to arrive at ammonium nitrate (AN) products having improved flowing behavior, especially aimed at porous AN particles for explosives manufacture.

The invention proposes the use of beads or granules of activated alumina (AA) as mixed flow aid. In particular, the inventor has found a method of preparation of AN products having improved flowing behavior, consisting in the addition of beads or granules of AA to AN particles before moisture protective bagging. Advantageously, this addition helps inhibiting the surface of as prepared AN particles to get moisturized during the period until final use.

Therefore, one aspect of the present invention relates to an ammonium nitrate product (hereinafter referred to as AN product of the invention or simply product of the invention) comprising a mixture of AN particles and beads or granules of AA. The AN product of the invention is useful as raw material for the manufacture of explosives; more particularly, it may be used as oxidizer component in explosive compositions.

Another aspect of this invention refers to a simple method for manufacturing the AN product of the invention comprising mechanical mixing of AN particles and beads or granules of AA which does not imply notable modification of the usual AN production process.

A further aspect of the invention relates to the use of beads or granules of AA as free-flowing external additive for AN solid particles.

These aspects and preferred embodiments thereof are additionally also defined hereinafter in the detailed description, as well as in the claims.

BRIEF DESCRIPTION OF THE DRAWINGS

FIG. 1 is a graphic representation of the (x,y,z) sampling coordinates used in example 1 for evaluating the moisture content as a function of sampling point within the FIBC and storage time.

DETAILED DESCRIPTION OF THE INVENTION

As used herein, the term "about" means a slight variation of the value specified, preferably within 10 percent of the value specified. Nevertheless, the term "about" can mean a higher tolerance of variation depending on for instance the experimental technique used. Said variations of a specified value are understood by the skilled person and are within the context of the present invention. Further, to provide a more concise description, some of the quantitative expressions given herein are not qualified with the term "about". It is understood that, whether the term "about" is used explicitly or not, every quantity given herein is meant to refer to the actual given value, and it is also meant to refer to the approximation to such given value that would reasonably be inferred based on the ordinary skill in the art, including equivalents and approximations due to the experimental and/or measurement conditions for such given value.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 micron to about 5 microns" should be interpreted to include not only the explicitly recited values of about 1 micron to about 5 microns, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value.

After extensive research, the inventor found that surface morphology of the AN particles had a main influence on final coating operations (e.g. with anticaking agents) as well as on its flowing behavior. AN particles that have been submitted to drying processes, typically porous AN particles produced from prilling AN solutions containing water (1-10 wt %), normally exhibit bulges and deformations on surface structure linked to saturated solution transfer towards surface through the pore network. These morphological deviations from round and smooth particles have a major impact on the loss of the mass-flow behavior of the bulk product, and thus in the apparition of arching phenomena that controls their discharge flow.

However, the inventor also found that if surface of the AN particle is fully dry, the effect of surface morphology could be cushioned. In this sense, it was evidenced that freshly produced porous AN showed good flowing behavior. Porous AN production process typically involves a final drying step, prior to cooling, sieving and anticaking coating operations, in which the AN particles surface is fully dried. This drying process can be fulfilled, leaving just some residual non-dryable moisture, normally ranging <0.1 wt %, ascribed to diffusion restricted inner particle positions.

Nevertheless, the good flowing behavior is lost as soon as the product was submitted to humid ambient (fixed time at relative humidity higher than critical relative humidity of AN) enough just to cause almost negligible (by standard analysis methods such as Karl-Fischer) moisture uptakes, assumed to take place at some extension on the external surface of the AN particles. Then, the inventor envisaged that if the surface of the AN particles was protected against moisture uptake, this is, if surface was maintained dry during the storage time until final use, mass-flowing behavior might be ensured.

Despite AN product is normally bagged in Protective Bags (PB) such as Flexible Intermediate Bulk Containers (FIBCs), the performance of these bags as moisture barrier is not totally effective. There exists a transport of water vapour through plastic layers obeying Fick's law, which relates mass transfer rate M (mol s$^{-1}$) to a concentration gradient, which acts as the driving force, and in a finite difference form is described as:

$$M = D \cdot A \frac{\Delta P_W}{\Delta X}$$

where D (m$^2$ s$^{-1}$) is the diffusion coefficient of the barrier material, A is the area (m$^2$), and $\Delta P_w$ (mol m$^{-3}$) is the water vapour partial pressure difference across the increment in length, the thickness of the barrier layer, $\Delta X$ (m).

Inside the PB, the water vapour partial pressure will be defined by the Critical Relative Humidity (CRH) of the AN, i.e., by the water vapour adsorption equilibrium dependence on temperature. If ambient air RH, and thus outer water vapour partial pressure, is higher, a partial pressure gradient between the two sides (in & out) will be generated, acting as the driving force for moisture transfer into the PB, which is then adsorbed on the AN product maintaining the equilibrium condition at the inside. Then, if storage conditions are unfavorable, this is, in the open and for humid locations, an effective moisture transfer through the PB layer(s) takes place.

Thus, the addition of moisture traps that could account for the moisture transferred through the PB layer(s) was considered by the inventor as a useful strategy to extend the mass-flowing behavior of the AN product.

The use of internal additives, melt additives, such as MgN was not considered due to the negative effect it might have on the characteristics of the porous AN, such as decreased porosity due to strong drying requirements.

Then, the mixing of the finished AN product with moisture traps was considered. The inventor envisaged that the moisture trap should have a number of properties as described below. It should be chemically compatible with the AN. It should function as preferential site for the adsorption of moisture transferred through PB layer(s), this function enabled by materials capable to decrease the RH well below the CRH of the AN. Moreover, it should be particulated, having particle size distribution and particle density similar to the ones of the AN, to prevent segregation processes, and it should be preferably white colored to prevent aspect heterogeneities. The moisture trap should also have high resistance to attrition and crushing. In addition, it should preferably enable chemisorption process, resulting in practically irreversible adsorption of water, instead of reversible physisorption or capillary adsorption that could induce redistribution processes, ascribed to temperature variations, of trapped moisture towards the AN. The moisture trap should show high adsorption capacity, in order to extend the storage time for which AN product will retain its mass-flowing behavior for minimum doses of the additive. This minimization of the additive dose is a critical requirement since AN products for explosive manufacturing require high purity, typically >99.0%. In this sense, the dose of additives, if not showing oxidizing characteristic, results in almost proportional decrease of final explosive specific energy. Another critical requirement is the specific cost that the additive will imply in the AN product. In any case, the additive dose should lead to minimum impact on both AN product characteristics and final explosive performance.

According to these requirements moisture trap screening was initiated. Typical moisture traps such as calcium chloride, activated carbons and alkaline (earth) oxides and hydroxides have not been considered due to incompatibility with AN. Drierite and anhydrous magnesium sulphate are chemically compatible, non-disintegrating, non-wetting, and economical to use. However, commercial products show non-spherical irregular shapes and water trapping capacity is relatively low. Zeolitic nature molecular sieves present outstanding adsorption capacity at low RHs, following a Langmuir-type adsorption isotherm, but in contrast, granule structuration requires incorporation of colored binders, some of which could have chemical incompatibilities with AN and, in addition, product price is not competitive.

Experimental tests were also conducted. Particular attention was paid to moisture traps agents previously proposed for AN such as the use of AN particles containing partially hydrated MgN. AN containing partially hydrated MgN has relatively low adsorption capacity. Anyhow, it has little effect on AN product characteristics as raw material for explosive manufacture, allowing higher doses which overcome this low adsorption capacity. However, it was found that as moisture content increases the hardness of this moisture trap decreases substantially resulting in very fragile product, whose collapse has a negative impact on product flowability.

To the best knowledge of the inventor, beads or granules of AA have not been suggested as protection agent against moisture uptake in the AN industry. However, beads or granules of AA seem to meet most of the requirements initially sought and were also evaluated in this moisture trap screening. It was observed that relatively low doses of beads or granules of AA provided products having improved flowing behavior.

The present invention has therefore developed a method of preparation of free-flowing AN products consisting in the use of beads or granules of AA as the most suitable flow aid to finish the AN particles that may be obtained in a standard prilling or granulation manufacturing process, just before packaging in PBs. Advantageously, the addition of beads or granules of AA to AN particles helps inhibiting the surface of as prepared AN particles to get moisturized due to water vapour permeation through PB layer(s) for a certain storage time, i.e. until adsorption capacity of the dosed alumina at the CRH of the AN is fulfilled.

The product of the invention represents a suitable replacement to AN particles currently commercialized or known in the state of the art. Preferably, the product according to the invention is a non-powder AN product comprising or consist of a mixture of AN particles, such as prills or granules, and beads or granules of AA. The product of the invention is especially advantageous with porous AN prills.

For the purpose of the present invention, AN particles may be prepared by conventional techniques well-known for a person skilled in the art. Beads or granules of AA are preferably ad-mixed subsequent to coating the AN particles with surface active anti-caking agent, such as those of organic nature commonly used in the industry, and before packing operations. Examples of anti-caking agents are those commercialized by ArrMaz under the trademark name GALORYL™ (e.g. GALORYL™ AT, GALORYL™ ATH, GALORYL™ ATH H) and by Kao Corporation under the trademark name SK FERT™; these agents typically consist of an oily base containing fatty amines, an oily base containing fatty amines and other fatty derivatives or a mixture of amines dispersed in mineral oil and wax.

In a preferred embodiment, the AN product of the invention is compatible with the requirements for use in explosives. With this in mind, technical grade ammonium nitrate products (commonly abbreviated as TGAN or TAN) manufactured as prills or granules are preferred. TAN products as prills or granules, comprising all AN products produced by means of prilling or granulation processes, are classified as dense (or high density) or porous (or low density), depending on their apparent density. Apparent density (pore density) of dense TAN prills or granules is in the range 1.05-0.90 g cm$^{-3}$. while it ranges 0.90-0.60 g cm$^{-3}$ for porous TAN, the latter type being preferred in the present invention.

AA is used for a wide range of adsorbent and catalysts applications. It is typically manufactured by calcination of boehmite or gibbsite at 400-600° C., resulting in a highly porous structured material of aluminum oxide. AA shows affinity for polar molecule (e.g. water) adsorption. The water adsorption capacity per unit weight of AA is directly proportional to its specific surface and depends on RH. For the purpose of this invention, AA is used in the form of granules or beads, which are commercially available even at particle size distributions that match the typical particle size distribution (PSD) of prilled porous AN. Preferably, the beads or granules of AA are of a large specific surface area (100-500 m$^2$g$^{-1}$) and show water adsorption capacities ranging 15-25 wt % at RH equal to 50%. In a more particular embodiment, the beads or granules of AA have a specific surface area ranging from about 250 to about 400 m$^2$g$^{-1}$. In a more particular embodiment, the beads or granules of AA have a particle size distribution of 1.0-5.0 mm (>95 wt %), more particularly 1.5-5.0 mm (>95 wt %) or 1.5-3.0 mm (>95 wt %). Moreover, bulk density of highly porous beads or granules of AA ranges 700-850 kgm$^{-3}$ which is also within prilled porous AN range. Additionally, beads or granules of AA have high resistance to attrition and crushing, if compared for instance to porous AN particles themselves, and they do not swell nor soften when adsorb water.

Very low amounts of beads or granules of AA have been proven to significantly improve the flowability behavior. In an embodiment of the invention, the beads or granules of AA are present in the product of the invention in an amount ranging from about 0.01 wt % to about 2.0 wt %, and more particularly from about 0.1 wt % or 0.2 wt % to about 1.0 wt % or 1.5 wt %. In particular embodiments, the amount is about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, about 1.0 wt %, about 1.1 wt %, about 1.2 wt %, about 1.3 wt %, about 1.4 wt %, or about 1.5 wt %. Preferably, the amount ranges from about 0.5 wt % to about 1.0 wt %. Of course, values above these ranges are also contemplated in the present invention, but less preferred from an economic point of view.

The AN product of the invention is useful as raw material for the manufacture of explosives, and in particular it is suitable as oxidizer component in explosive compositions. In a particular embodiment the AN product of the invention consists essentially of a mixture of i) AN particles and ii) beads or granules of AA. In a more particular embodiment the AN product of the invention consists of a mixture of i) AN particles and ii) beads or granules of AA. In addition, the present invention relates to an explosive comprising the AN product of the invention.

EXAMPLES

Two porous prilled ammonium nitrate products, namely PPAN A and PPAN B, were tested.

The definitions related to the tests are as follows:

Flowability Test:

A 1000 g sample of the porous AN is placed inside a hopper, which is then submitted to fixed vibration conditions (acceleration of 6.0 ms$^{-2}$ for 1 min) in order to mimic real operation compaction process. Once vibration stops, the sample is allowed a defined time at rest before opening the unloading valve. The time needed for the sample to fully discharge is recorded. If the sample requires more than 300 s to discharge, the test is concluded.

Two types of discharge flow have been evidenced. On one hand, mass-flow, which describes continuous flow of PPAN particles ranging 5 to approx. 8 s for full discharge. On the other hand, controlled-flow, for which cohesive arching episodes lead to a discontinuous flow at the beginning of the discharge operation. Once a critical discharge time (discharge amount) has been reached the arch fully collapses and the the mass-flowing behavior is recovered. In the limit, the discontinuous flow can be so slow that test result is considered as absence of flow (if discharge time higher than 5 min).

Moisture Content:

The moisture content of the PPAN samples was established as the mean of three Karl-Fischer measurements.

Sample Aging Simulation:

The dry fresh sample is submitted to aging process in order to simulate moisture uptake during real storage and transport stages. The process consists in bagging the fresh dry sample in low-density polyethylene (LDPE) zip bags (2 L capacity and 50 µm thickness). After, the bagged sample is submitted to humid ambient conditions. Due to several facts this simulation fastens up the real moisturizing process, as it takes place in the FIBCs. On one hand, the specific area of the PB layer, per AN product unit mass, is much higher in these small bags than in FIBCs. In addition, the moisture vapor transmission rate of LDPE, i.e. the diffusion coefficient, is higher than the ones for real FIBC materials PP and HDPE. Moreover the thickness is lower for these zip bags which present just one layer.

Friability

The sample is sieved to remove fines (<1.00 mm). Approximately 100 g of this sieved sample is feed to a cyclone operated with dry air at 170 kPa. Sample collected from the bottom outlet of the cyclone is further sieved through 1.00 mm screen. The amount of fines generated is measured and expressed as wt % of the initial sample weight.

Crushing Strength

The sample is screened in between 2.00 and 3.00 mm, and the obtained product is subsequently submitted, particle by particle, to a crushing strength (CS) test by means of an electronic compression force gauge. The average compression force (in N) at the crushing point is calculated from a total of 20 measurements.

Example 1

This example shows the moisturizing process due to water vapour permeation through PB layer(s). Freshly produced porous AN B having a moisture content equal to 0.03 wt % was bagged in two FIBCs, 1000 kg capacity, and leaved isolated in the open. Two layer FIBCs, external laminated PP layer (~160 gm$^{-2}$) and internal HDPE layer (~100 µm thick), were used.

The FIBCs were stored in the open for 2 and 6 months, respectively. Time after which, using an appropriate sampling device, samples were picked from different internal positions at the FIBCs as described in FIG. 1 by (x,y,z) coordinates: being $z_1$, $z_2$ and $z_3$ cotes nearby 5, 30 and 55 cm down from the top of the FIBC, $y_1$ nearby 50 cm, i.e. central position on its face, and $x_1$ and $x_2$ 10 and 50 cm, respectively.

Samples were bagged and readily submitted to moisture analysis, results shown in Table 1.

TABLE 1

Moisture content as a function of sampling point within the FIBC and storage time

| Sampling position | Moisture content | |
|---|---|---|
| | After 2 months | After 6 months |
| $x_1y_1z_1$ | 0.04 | 0.07 |
| $x_1y_1z_2$ | 0.04 | 0.08 |
| $x_1y_1z_3$ | 0.04 | 0.05 |
| $x_2y_1z_2$ | 0.03 | 0.04 |
| $x_2y_1z_3$ | 0.04 | 0.08 |

Results evidenced that there exist some permeation through FIBCs layers whose extension depends on storage time. As a result of this permeation process, a gradient of moisture content, increasing from central positions towards positions near the layers of the FIBC, was generated.

Example 2

This example shows the effect of mixing varying doses of AA beads (1.5-3.0 mm) with fresh dry porous AN A and B products under simulated packaging conditions. The resulting flowing characteristics together with moisture uptake data over the AN products are shown in Tables 2 and 3.

TABLE 2

Moisture content (h) on the porous AN and discharge time for 20 min at rest (t), after submission of porous AN A-AA bead compositions to different aging times. Aging ambient conditions (15-25° C. and 50 < RH < 95%).

| AA bead dose, wt % | As dried | | After 2 days | | After 6 days | | 14 days | | 30 days | |
|---|---|---|---|---|---|---|---|---|---|---|
| | h, % | t, s | h, % | t, s | h, % | t, s | h, % | t, s | h, % | t, s |
| — | 0.04 | 4 | 0.05 | — | 0.06 | — | 0.11 | — | 0.12 | — |
| 0.1 | 0.04 | 4 | 0.05 | 18 | 0.07 | — | 0.12 | — | 0.13 | — |
| 0.2 | 0.04 | 5 | 0.05 | 5 | 0.06 | — | 0.09 | — | 0.11 | — |
| 0.5 | 0.04 | 4 | 0.04 | 4 | 0.05 | 5 | 0.07 | — | 0.10 | — |
| 1.0 | 0.04 | 5 | 0.04 | 5 | 0.04 | 5 | 0.05 | 250 | 0.07 | — |

TABLE 3

Moisture content (h) on the porous AN and discharge time for 20 min at rest (t), after submission of porous AN B-AA bead compositions to different aging times. Aging ambient conditions (5-7° C. and RH >80%)

| AA bead dose, wt % | As dried | | After 4 days | | After 9 days | | 18 days | | 30 days | |
|---|---|---|---|---|---|---|---|---|---|---|
| | h, % | t, s | h, % | t, s | h, % | t, s | h, % | t, s | h, % | t, s |
| — | 0.04 | 4 | 0.05 | — | 0.06 | — | 0.07 | — | 0.09 | — |
| 0.5 | 0.04 | 4 | 0.04 | 5 | 0.04 | 5 | 0.06 | 145 | 0.07 | — |
| 1.0 | 0.04 | 5 | 0.04 | 4 | 0.04 | 5 | 0.05 | 5 | 0.06 | — |

Results evidence that the addition of AA beads allowed preventing the bagged AN products to get moisturized due to permeation through PB layer up to a certain extent, i.e. to a certain amount of permeated water vapour, depending on the dose of the specific AA beads used. In contrast to residual "non-dryable" moisture, this permeated water vapour would have the ability to adsorb in any surface position of the porous AN, including external surface where inter-particle contact takes place. In the same trend, it has been evidenced that slight increase of moisture content due to permeation, even values equal to 0.01%, result in a noticeable impact on flowing behaviour of these porous AN products.

Example 3

This example shows the disadvantage of using materials that despite showing moisture trap behaviour as preferential sites for water adsorption are or become fragile enough to collapse in real handling operations. AN containing partially hydrated MgN is an interesting moisture trap additive since its dosage has little effect on AN product characteristics as raw material for explosive manufacture. Moreover, for moisture contents below full hydration of the MgN, this additive is harder than porous AN. However, moisture content exceeding the MgN hydration value, results in a dramatic drop on the hardness. Table 4 shows the effect of moisture content on the hardness (expressed as friability and crushing strength) of a dense AN containing around 2300 ppm of Mg as MgN, this is, hexahydration achieved for approximately for a moisture content equal to 1.0 wt %.

TABLE 4

Moisture content (h) of the dense AN containing MgN and its effect on crushing strength (CS) and friability (F)

| h, wt % | F, % | CS, N |
|---|---|---|
| 0.6 | 0.0 | 9.8 |
| 1.0 | 0.0 | 8.3 |
| 2.1 | 2.8 | 0.4 |
| 3.0 | 7.4 | 0.5 |

The addition of 5 wt % of crushed AN containing MgN having a moisture content equal to a 2.1 wt % resulted in the total suppression of the discharge flow of as dried porous AN A and B products.

In contrast, it has been found that AA beads used in previous examples have high resistance to attrition and crushing. Moreover, AA beads maintain hardness after adsorbing water. For example, a crushing strength value equal to 26.7 and 16.2 N was established for fresh AA beads and AA beads after overnight immersion in water, respectively. Friability was equal to 0% in both cases. This ensures no practical crushing of AA bead additive in normal applications for product of the invention.

The invention claimed is:

1. An ammonium nitrate (AN) product comprising a mixture of:
   i) AN particles; and
   ii) beads or granules consisting of activated alumina (AA),
wherein over 95% by weight of the beads or granules of AA have a particle size distribution ranging from 1.0 to 5.0 mm.

2. The AN product according to claim 1 consisting essentially of a mixture of:
   i) AN particles; and
   ii) beads or granules of AA.

3. The AN product according to claim 1, wherein the AN particles are coated with an organic anticaking agent.

4. The AN product according to claim 1, wherein the AN particles are technical grade AN particles.

5. The AN product according to claim 1, wherein the AA is present in an amount ranging from about 0.01 wt % to about 2 wt %.

6. The AN product according to claim 1, wherein the AA is present in an amount ranging from about 0.1 wt % to about 1.0 wt %.

7. The AN product according to claim 1, wherein the beads or granules of AA have a specific surface area ranging from about 100 to about 500 $m^2g^{-1}$.

8. The AN product according to claim 1, wherein the beads or granules of AA have a specific surface area ranging from about 250 to about 400 $m^2g^{-1}$.

9. The AN product according to claim 1, wherein over 95% by weight of the beads or granules of AA have a particle size distribution ranging from 1.5 to 3.0 mm.

10. The AN product according to claim 1, wherein the AN product is suitable as a raw material for explosives manufacture.

11. The AN product according to claim 1, wherein the AN product is suitable as oxidizer in explosives.

12. An explosive comprising the AN product as defined in claim 1.

13. A method for preparation of an ammonium nitrate (AN) product of claim 1 comprising mechanically mixing AN particles with beads or granules consisting of activated alumina (AA), wherein over 95% by weight of the beads or granules of AA have a particle size distribution ranging from 1.0 to 5.0 mm.

14. The method according to claim 13, wherein the beads or granules of activated alumina are mixed with the AN particles after the AN particles have been dried, cooled down and coated with an organic anticaking agent, and before being bagged in Protective Bags.

15. The method according to claim 13, wherein the AN particles are technical grade AN particles, preferably porous technical grade AN particles.

* * * * *